June 3, 1952 E. BRUCE ET AL 2,599,368

BEAM SWITCHING SYSTEM

Filed May 10, 1948 9 Sheets-Sheet 1

INVENTORS: E. BRUCE
L. GROSS

BY [signature]

ATTORNEY

INVENTORS: E. BRUCE
L. GROSS
BY John A. Hall
ATTORNEY

BEAM SWITCHING SYSTEM

Filed May 10, 1948 9 Sheets-Sheet 3

INVENTORS: E. BRUCE
L. GROSS
BY John A. Hall
ATTORNEY

BEAM SWITCHING SYSTEM

Filed May 10, 1948 9 Sheets-Sheet 4

INVENTORS: E. BRUCE
L. GROSS
BY John A. Hall
ATTORNEY

June 3, 1952 E. BRUCE ET AL 2,599,368

BEAM SWITCHING SYSTEM

Filed May 10, 1948 9 Sheets-Sheet 5

INVENTORS: E. BRUCE
L. GROSS

BY [signature]

ATTORNEY

June 3, 1952 E. BRUCE ET AL 2,599,368

BEAM SWITCHING SYSTEM

Filed May 10, 1948 9 Sheets-Sheet 6

INVENTORS: E. BRUCE
L. GROSS

BY [signature]

ATTORNEY

NUMBER GROUP- COMMON CONTROL

INVENTORS: E. BRUCE
L. GROSS
BY [signature]
ATTORNEY

INVENTORS: E. BRUCE
L. GROSS
BY John A. Hall
ATTORNEY

INVENTORS: E. BRUCE
L. GROSS
BY [signature]
ATTORNEY

Patented June 3, 1952 2,599,368

UNITED STATES PATENT OFFICE 2,599,368

BEAM SWITCHING SYSTEM

Edmond Bruce, Red Bank, N. J., and Leo Gross, Bayside, N. Y., assignors to Bell Telephone Laboratories, Incorporated, New York, N. Y., a corporation of New York Application May 10, 1948, Serial No. 26,014

5 Claims. (Cl. 250—7)

This invention relates to telecommunication systems and particularly to switching systems for the establishment of interconnections between the subscribers' stations of such telecommunication systems.

The object of the invention is the attainment of great speed in the establishment of connections. Heretofore, particularly in machine switching or dial telephone systems very expensive apparatus has been developed and used to control the movement of what now may be termed slow moving mechanical elements of the system. The present invention is based on the use of switching means which is capable of completing the establishment of a connection in a very small fraction of a second as compared to the several seconds heretofore necessary.

Another object of the invention is to provide means for switching by the use of inertialess beams rather than through the use of comparatively massive mechanical elements. The movement of the beams may be made extremely rapid since the beams themselves being inertialess may be moved practically instantaneously and the means for directing the movement thereof as, for instance, by the movement of piezoelectric crystals may be extremely rapid.

Another object of the invention is to employ a switching means in which a plurality of communication channels may be established through space on a non-interfering basis regardless of the fact that any given established channel may geometrically intersect one or more of the other established channels.

Still another object of the invention is to provide a communication system in which the usual central office multiple is eliminated, that is, one in which each subscriber's line or each inter-office trunk line has but a single appearance in a switching system.

The invention in its preferred form discloses a system employing visible light beams but comprehends any form of radiant energy which may be controlled in the form of beams. The practical limits are from beyond the low infra-red to the extreme ultra-violet, in terms of frequency, from $10^{10}$ to $10^{16}$ cycles per second and are here only limited by the practical consideration of the means for control as, by way of example, the dimensions of lens and other optical systems. Stated otherwise, the invention contemplates switching by means of beams of transverse electromagnetic waves.

Another object of the invention is to provide a broad band switching system or a system in which broad band communication channels may be rapidly and economically set up. Again, the invention has been disclosed, by way of example, as a telephone switching system but may be used with an equal facility for other purposes such as switching television channels where the broad band feature is particularly valuable. It is known that in mechanical switching systems the breadth of the frequency band employed is limited by considerations of cross-talk. The use of beams which are non-interfering even though they may intersect in the geometrical sense is a desirable feature for this purpose.

It is to be noted that a communication channel using a radiant energy beam is not limited in the breadth of a band that may be transmitted as is the conventional pair of wires. It is well known that bands of megacycle width must be channelled over coaxial conductors and even wave guides and in such cases the switching problem becomes difficult and expensive. The beam, however, is not so limited and will transmit without any serious attenuation any wide band over which it may be modulated.

The invention consists of a beam switching system and is centered about the use of retro-directive optical means having the unique property of projecting the reflected beam back on the exact line over which the beam reached this optical device so that a communication channel for two-way signalling may be established in space over a single geometrically straight line. In accordance with this invention a corner reflector is employed which may be defined as a device consisting of three intersecting and mutually perpendicular reflecting surfaces. The invention, however, is not limited to this particular form of optical device but comprehends the use of any retrodirective reflector such, for instance, as the device known as a "cat's eye." This, as is well known, consists of a surface for receiving a light beam which is parabolic in contour and is backed up by a spherical surface placed at the exact focal length of the paraboloid whereby a beam from any direction impinging upon the parabolic surface will be reflected from the rear spherical surface back on the exact line over which it reached the parabolic surface. Whereas a plane reflecting surface will only reflect a beam back on itself from the zenith, the retrodirective reflector will so reflect a beam from a wide deviation therefrom.

A switching system is then constructed by mounting on a surface a large number of corner reflectors, one associated with each subscriber's line. In a preferred embodiment of the invention the pyramidal tip of each (where such corner reflector is constructed of a solid piece of glass or other transparent material having the three mutually perpendicular surfaces fashioned therefrom) may be truncated so as to pass therethrough a fraction of the beam directed thereat and a beam sensitive device mounted on or at this truncated point so as to translate beam variations into electrical signals for transmission to the associated line. Where the corner reflector is constructed of solid transparent material the front surface thereof, a plane surface substantially normal to the zenith line of such reflector, must be coated so as to be non-reflecting whereby all the light directed toward the corner reflector surfaces may be allowed to reach them and none dissipated by reflection from the other surface of the device. Alternatively a "window" may be otherwise formed on one or more of the surfaces near the intersection thereof, particularly where the corner reflector may be formed of mirrors. In any case, a fraction of the light beam directed to the corner reflector falls upon a beam sensitive device so that such beam as modulated at the distant end may translate the modulations thereof into electrical signals.

A beam controlling device may also be placed before said corner reflector so as to be in the path of a reflecting beam. This device being also connected to the associated line would translate electrical signals transmitted over said line into beam variations. At a distant point there will be a plurality of beam producing and beam directing devices with beam controlling and beam responsive devices connected to other lines thereat. Any one of such other lines may then signal control to its beam directing means and by thus pointing a beam to a selected one of the distant corner reflectors immediately establishes a connection between the line associated therewith and the said other line.

One simple arrangement of these means may consist of a single telecommunication exchange in which each line has an appearance in a corner reflector at one end of a room and in beam directing and translating means at the other end of the room. The appearance in the corner reflector would be termed the called line appearance while the appearance at the other end of the room in the beam directing means would be known as the calling line appearance thereof.

In another arrangement, each line may have only a single appearance at which end would be four elements. First, a corner reflector; second, a beam directing means; third, a beam sensitive means; and fourth, a beam controlling means. In this arrangement, each of the units for all of the lines would be mounted on a single wall and the beams produced would be directed toward one of the other lines through the use of a mirror at the other end of the room.

In another arrangement, all the lines of an exchange would each have a single appearance in the combination of a reflector, a beam sensitive device and a beam controlling device on a single wall of the line. At the opposite wall thereof there would be a plurality of link circuit terminations each consisting of a beam directing device, a beam sensitive device and a beam controlling device. These link circuit terminations would enter a circuit arrangement whereby connections could be established between the various lines of the exchange and the various link or trunk circuits.

In another arrangement, the link circuits would each have a pair of beam directing devices and their associated beam sensitive and beam controlling devices so that a connection could be established between two of the lines of the same exchange over two beams directed from a single link circuit termination.

A feature of the invention is a switching system in which a light beam having light directed in both directions along the same straight line is used as a two-way communication channel and having means at one end thereof to selectively direct said beam to any one of a plurality of communication channel terminations, and means at said selected termination to reflect the said beam back on itself.

Another feature of the invention consists of means at each end of a two-way light beam to absorb a fraction of the incoming beam by translating means for producing signals therefrom, and means to modulate the outgoing beam to transmit signals over said light beam to the other end thereof.

Another feature of the invention consists in the use of a corner reflector having a truncated pyramidal tip in the rear of which is placed an outgoing beam directing means and an incoming beam sensitive means in combination with a modulating means for affecting the outgoing beam whereby all four elements necessary for a two-way light beam communication system are located at one point.

Another feature of the invention consists in the use of electroresponsive means for rotating a pair of mirrors to direct a light beam over a coordinate array of receiving points each of which employs a corner reflector to reflect the light directed thereto back on itself over the same geometrically straight line. In its preferred form piezoelectric crystals are disclosed as a practical and economical means for this purpose.

Another feature of the invention is a means for establishing a plurality of connections over straight lines in space without interference where two or more of such lines may intersect. Where cords are used for making connections to a great array of lines terminating in jacks the confusion and tangle of a large number of cords used simultaneously poses a mechanical problem involving cord construction, insulation, etc., to withstand the mechanical interference of the cords. In the present arrangement, there is no mechanical or other interference between the beams even where a direct or geometrical intersection of the beams takes place.

Another feature of the invention is a means for simultaneously establishing a plurality of connections to a single line whereas there will be means provided in such a beam switching system as disclosed herein to normally prevent the establishment of more than one connection to a line at a time, that is, the usual busy test functions and means will be provided. There will also be the means for establishing what are known as conference connections whereby several lines may be connected together simultaneously. Such connections are feasible when several light beams from different sources are simultaneously directed at the same corner reflector, for the corner reflector itself is capable of simultaneously reflecting an infinite number of light beams each back on itself from an infinite number of distant sources.

Another feature of the invention is a system including a light beam established between two corner reflectors, one at either end of the beam whereby multiple reflections on a single straight line may be employed.

Still another feature is a system including a plurality of lines and a plurality of trunks with a light beam source and a beam director per trunk. This trunk may end at a distant point in a single arrangement or in some other more conventional arrangement. In accordance with this feature but a single light beam per trunk termination is employed.

Other features will appear hereinafter.

The drawings consist of nine sheets having eleven figures as follows:

Fig. 1 is a schematic showing one switching plan and illustrating the principle of the invention;

Figs. 2 to 5 arranged as shown in Fig. 10 constitute a circuit diagram showing one embodiment of the arrangement illustrated in Fig. 1 and in which Fig. 2 shows the line circuit, Fig. 3 shows the light beam terminating arrangements, Fig. 4 shows the beam positioning circuit in the common control circuit and Fig. 5 shows the number group device in the common control device;

Figs. 2, 4, 6 and 7 arranged as indicated in Fig. 11 show a similar circuit diagram as a variation of the arrangement shown in Figs. 2 to 5 and in which Fig. 6 shows the light beam terminating arrangements and Fig. 7 shows an electronic number group device in the common control;

The broad outline of the telecommunication switching system using light beams as part of the talking path is set forth herein. The essential parts of the switching means are a light beam, modulated and directed toward a retrodirective mirror (or corner reflector). Associated with each corner reflector is a photodetector and a modulator. This modulator impresses a signal on the reflected beam which signal is then transmitted over the beam to the distant selected point. Another photodetector mounted in close proximity to the light source detects the signals on the reflected beam. By directing one light beam toward a selected one of a plurality of retrodirective mirrors and thereby reflecting the light beam back on itself, two-way communication may be established.

Several switching plans using the light beam talking paths are herein set forth. The location of the beam directors and the light sources with respect to the retrodirective mirrors is the distinguishing feature of each of these arrangements.

Figures 1, 10, 11:
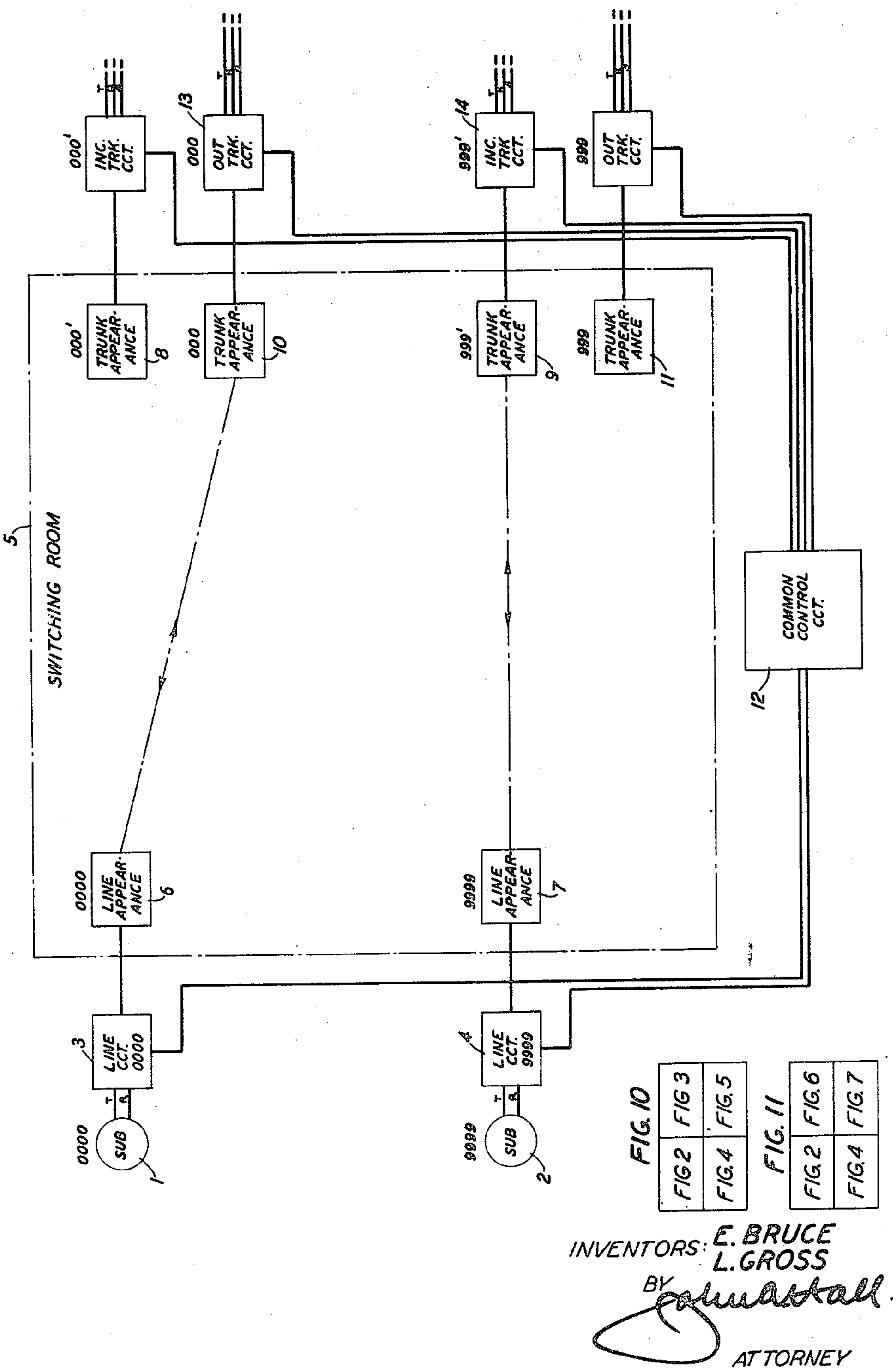
Fig. 10 is a block diagram showing how Figs. 2 to 5 may be arranged.
Fig. 11 is a block diagram showing how Figs. 2, 4, 6 and 7 may be arranged to provide a complete circuit diagram.
Figure 8:
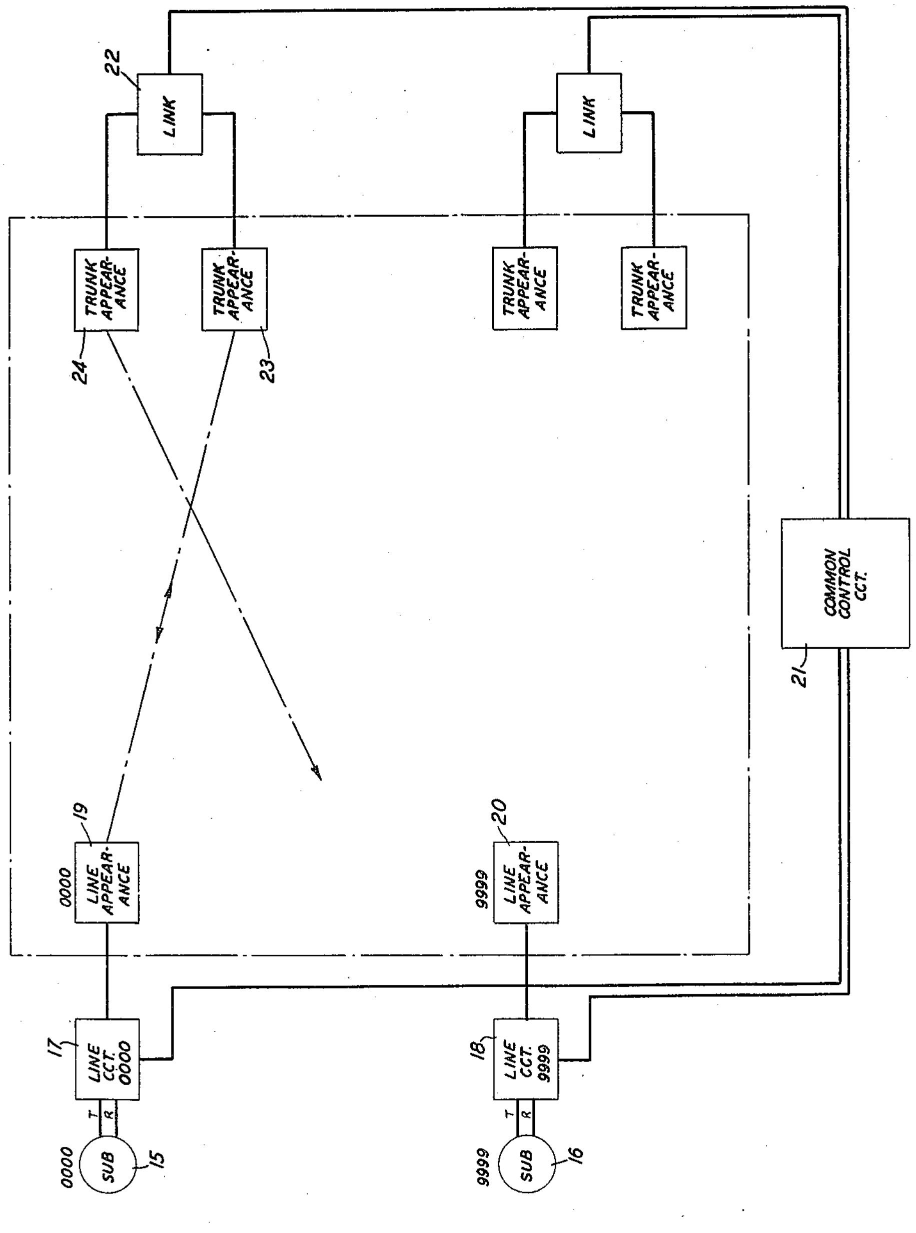
Fig. 8 is a schematic similar to that shown in Fig. 1 whereby connections are established by means of link circuits.
Figure 9:
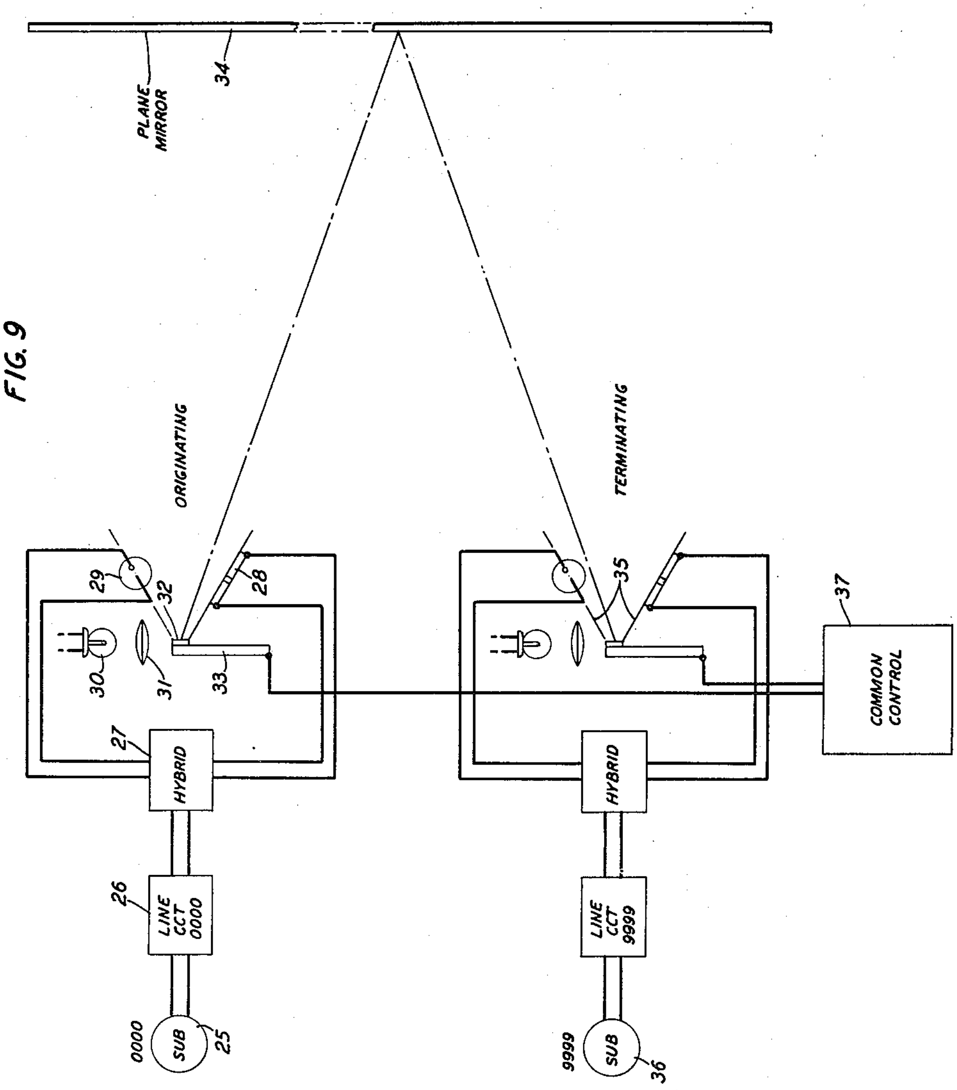
Fig. 9 is another schematic similar to that of Fig. 1 showing a plan whereby connections are set up by apparatus individual to the subscribers' lines through a light beam reflected by a plane mirror from one line appearance to another.

(*a*) The arrangement shown in Fig. 1 is one in which each line appears in a retrodirective mirror with its various controlling devices so that a connection may be set up by a light beam directed thereto either from an incoming trunk appearance or an outgoing trunk appearance;

(*b*) The arrangement shown in Fig. 8 is one in which link circuits are used, each having an incoming and an outgoing terminal by means of which a light beam may be directed to two line appearances thereby interconnecting the two and establishing communication between them; and (*c*) The arrangement shown in Fig. 9 is another variation by means of which each line appearance has all of the elements necessary for establishing intercommunication by light beams so that a calling line may select any one of a number of other lines by directing a light beam toward the line appearance of the other as reflected by a plane mirror at the end of a switching room.

By way of example, the line appearances, that is, the retrodirective mirror and the other controlling devices may be mounted on one wall of what may be termed a switching room. The apparatus for each line would occupy about a 2-inch square so that an array of 100 x 100 to make a 10,000 line exchange would fill a wall 17 feet square. Trunk appearances of a lesser number, say 10 per cent of this, would be mounted on a parallel wall distant about 70 feet. These dimensions are by way of example only, and may be varied for different purposes.

In Fig. 1 two of 10,000 subscribers' stations 1 and 2 are shown. The substation 1 is numbered 0000 and the substation 2 is numbered 9999, it being understood that the other substations of this system have other numbers between these two limiting values. Each line extends from the premises of a subscriber to the central office over a two-wire line known as the tip and ring and each has its own line circuit such as the circuits 3 and 4, respectively.

The switching room 5 is shown as a large broken line rectangle. Within this switching room and at the left-hand wall thereof the line appearance 6 for the substation 1 and the line appearance 7 for the substation 2 are shown. At the other end of the room, incoming trunk appearances 8 and 9 and outgoing trunk appearances 10 and 11 are shown.

The subscriber at substation 1 may through his control of the common control circuit 12 cause a connection to be established between the line appearance 6 and the trunk appearance 10 for the outgoing trunk 13 extending to some distant point. In a similar manner a call coming in over an incoming trunk 14 may through the use of the common control circuit 12 cause a connection to be established between the trunk appearance 9 and the line appearance 7. The establishment of these connections consists essentially of the direction of a light beam from the trunk appearance either incoming or outgoing to the retrodirective mirror in the line appearance. The details of these devices are shown and explained more fully hereinafter.

In Fig. 8 a somewhat similar arrangement is shown. Here the subscribers' lines 15 and 16 with their associated line circuits 17 and 18, respectively, and their associated line appearances 19 and 20, respectively, may through the use of the common control circuit 21 establish light beam connections between the various subscribers' circuits. For instance, the subscriber at substation 15 through the use of the common control circuit 21 may control the link 22 so that one light beam will be established between the trunk appearance 23 and the line appearance 19 of the calling line and another light beam between the trunk appearance 24 and a selected one of the lines to which a connection is desired, whereby communication may be established between substation 15 and the said selected substation.

In Fig. 9 another general outline plan is disclosed. In this the substation 25 is connected through a line circuit 26 and thence through a hybrid coil 27 having a transmitting device 28 mounted on or associated with one of the plane surfaces of a retrodirective mirror and a receiving device 29 similarly mounted on or associated with another of the plane surfaces of the retrodirective mirror. Associated with this line appearance there is a lamp 30 shown as a source of light with a lens 31 to create a beam which will then be reflected by two mirrors such as the mirror 32 mounted on a member 33 which is capable of a small movement so that when two of these mirrors are each moved the light beam may be directed in any desired direction. In Fig. 9 such a light beam is indicated as being directed to a plane mirror 34 and reflected therefrom to the retrodirective mirror 35 associated with a selected subscriber's line 36.

Each line, such as the lines 25 and 36, may through the use of the common control 37 cause the appropriate movements of the devices such as 33 to move the mirrors such as the mirror 32 to direct the light beam as desired.

In each of these devices or plans, communication from one station to another is effected through the modulation of the light beam at the originating end and the detection of the modulated light beam and the translation thereof at the other end. Many well known and conventional components can be used for these purposes.

LINE AND TRUNK APPEARANCES

A. *The line*

Figure 3:
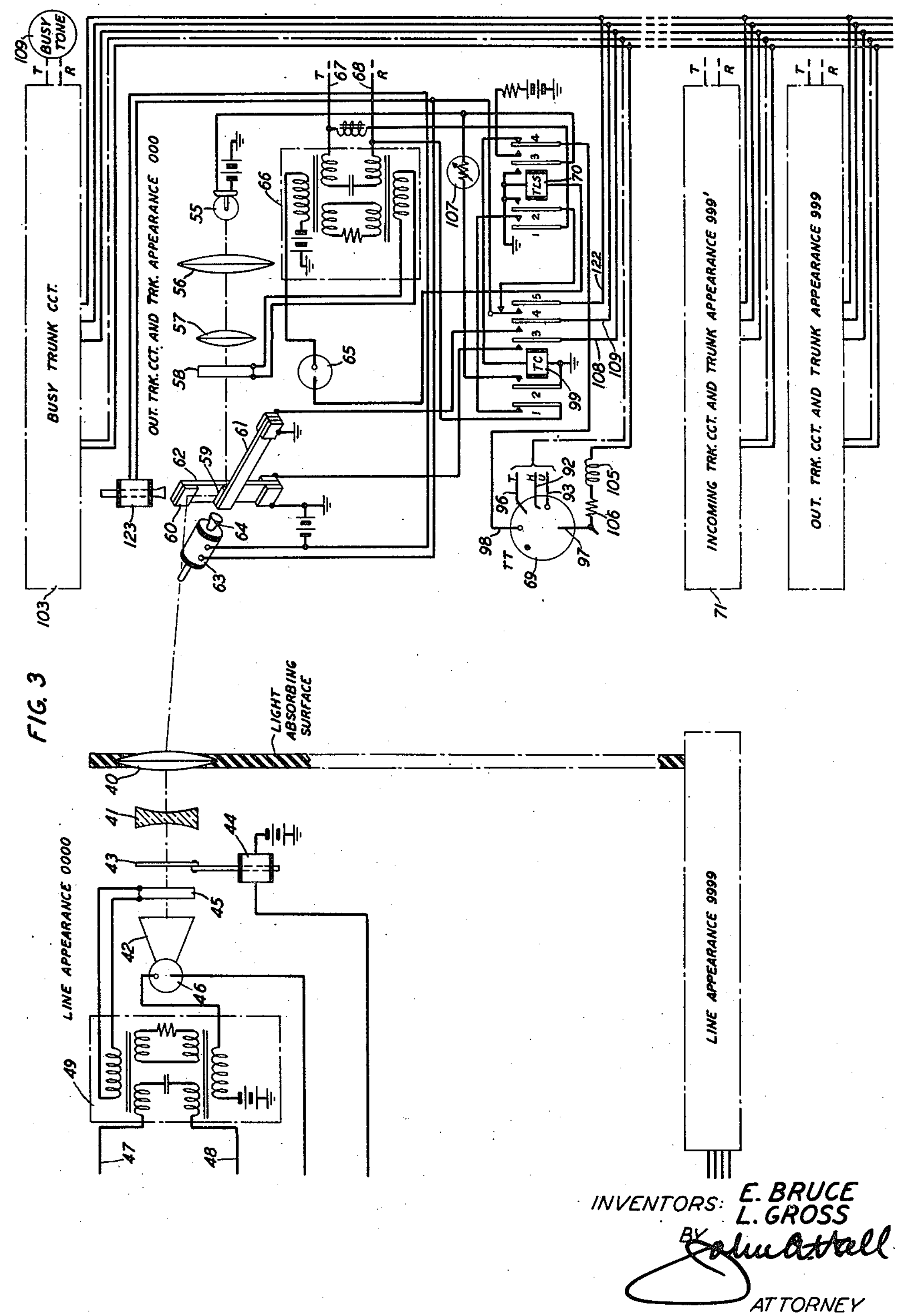

The line appearance shown in Fig. 3 consists of a lens system shown herein as the lens 40 and the lens 41 to collect the incident beam from a distant source and concentrate a parallel beam upon the corner reflector 42 behind it. The lenses are coated to minimize optical reflections and are of short focal length so that what little light is reflected will be widely scattered to reduce optical cross-talk. A shutter 43 operated by a solenoid 44 mounted behind the lenses operates when the line is in use and permits light to pass through the modulator 45 and fall upon the corner reflector which is here shown as having a photodetector 46 mounted at its truncated vertex. The photodetector 46 and the modulator 45 are connected to the lines 47 and 48 through a conventional hybrid coil 49, the photodetector acting as a receiver of incoming signals and the modulator acting as a transmitter of outgoing signals.

Since each line appearance is part of a two-dimensional array, the line circuit (Fig. 2) identifies its appearance by two voltages corresponding to its coordinates in the array. Whenever the line circuit is energized, this information (or the two said voltages) is used to direct a light beam upon the line appearance in question. In the absence of a metallic path between trunk and line, supervision is maintained by the presence of the light beam. The change from "dark" to "light" current operates a light current supervisory relay (LCS). This dissipates a fraction of the signal received by the photodetector but this loss may be avoided by some conventional form of trigger action circuit.

Each half of a connection in the originating and terminating offices is held up by the local substation circuit. At the termination of the connection when the line is released by the holding subscriber the shutter 43 in the line circuit is released and the shutter closed, thereby releasing the light current supervisory relay in the trunk, thereby restoring the trunk to normal. The ringing arrangements are local to each line circuit.

Figure 2:
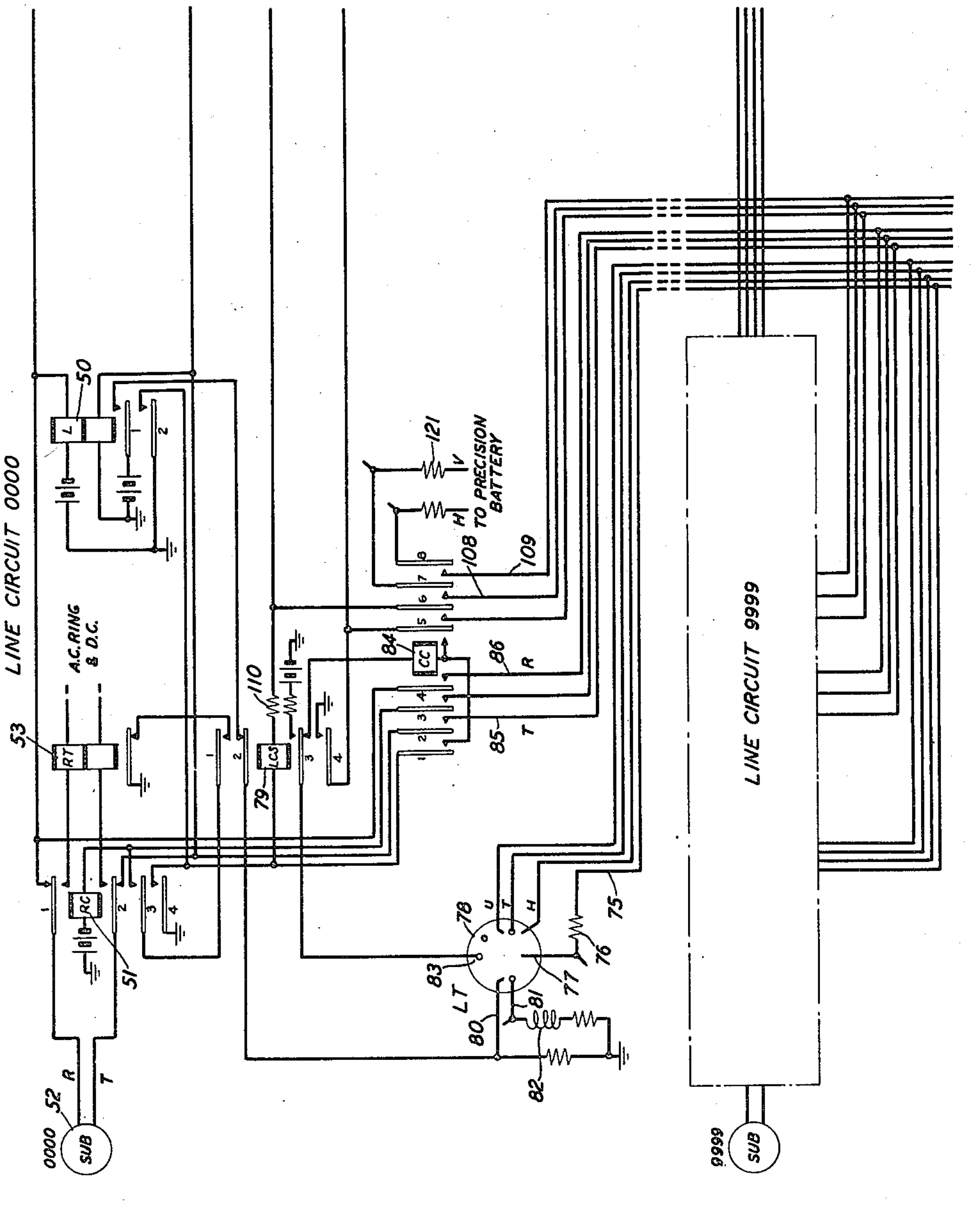

The connection between the line appearance in Fig. 3 and the line circuit in Fig. 2 is as follows: The lines 47 and 48 derive talking current through the windings of a line relay 50 from a source of battery and ground and extend through the back contacts of the ringing connect relay 51 to the substation line. When the subscriber thereat makes a call the line relay 50 will be operated and will establish connections which will be more fully described hereinafter.

When the substation 52 is selected to have a connection established thereto then the ring connect relay 51 will be operated and will connect the line conductors through the windings of the ringing trip relay 53 to a source of ringing current in the conventional manner. When the called subscriber answers the ringing trip relay 53 will operate and by removing a ground connection to a holding circuit of the ring connect relay will allow this relay to release and establish the connection to the lines 47 and 48 and thence through the hybrid coil 49 to the various devices for establishing the connection over the light beam.

B. *The trunk*

The trunk appearance shown to the right in Fig. 3 consists of a light source 55 and a lens system consisting of the lenses 56 and 57 designed to form a parallel light beam of spot size, less than an inch in diameter at the line appearance. Due to the unavoidable divergence of a light beam the light source, real or virtual, must be small (for example, not larger in diameter than .005 inch). The light beam passes through a modulator 58 and falls on the beam directors 59 and 60. These are two mirrors mounted at right angles to each other, one rotated in azimuth and the other in altitude. Voltages applied to their deflecting elements 61 and 62 determine their angular position and the location of the light beam on the line appearance field. The deflecting elements 61 and 62 may, by way of example, be piezoelectric crystals. The beam directors may be locked in place, once deflected, by a solenoid operated clamp. Thus a solenoid 63 controls an element 64 in such manner that when the solenoid is energized the element 64 will firmly push against the end of the beam director and hold it in the position to which it has been moved by the electrical potentials applied. A photodetector 65, placed in close proximity to the modulator 58, intercepts a portion of the reflected light beam from the selected line appearance and detects the signal thereon. A hybrid coil 66 connects the modulator and photodetector to the trunk represented by the trunk conductors 67 and 68.

An idle outgoing trunk circuit is seized in a lock-out circuit by firing a trunk tube 69 through the number group as will be explained more fully hereinafter. The location voltages of the line appearance to which a connection is to be established are applied to position the beam director. A time delay is inserted so that the light beam is produced after the beam directors have come to rest and the light beam does not sweep over undesired line appearances. When the reflected beam is detected the "light" current operates the trunk supervisory relay 70 to complete the trunk circuit connection.

An incoming trunk herein indicated by the broken line rectangle 71 has those features of the line circuit used for initiating calls and is conventional except for the arrangements shown and described in connection with the outgoing trunk appearance.

THE COMMON CONTROL

Figure 4:
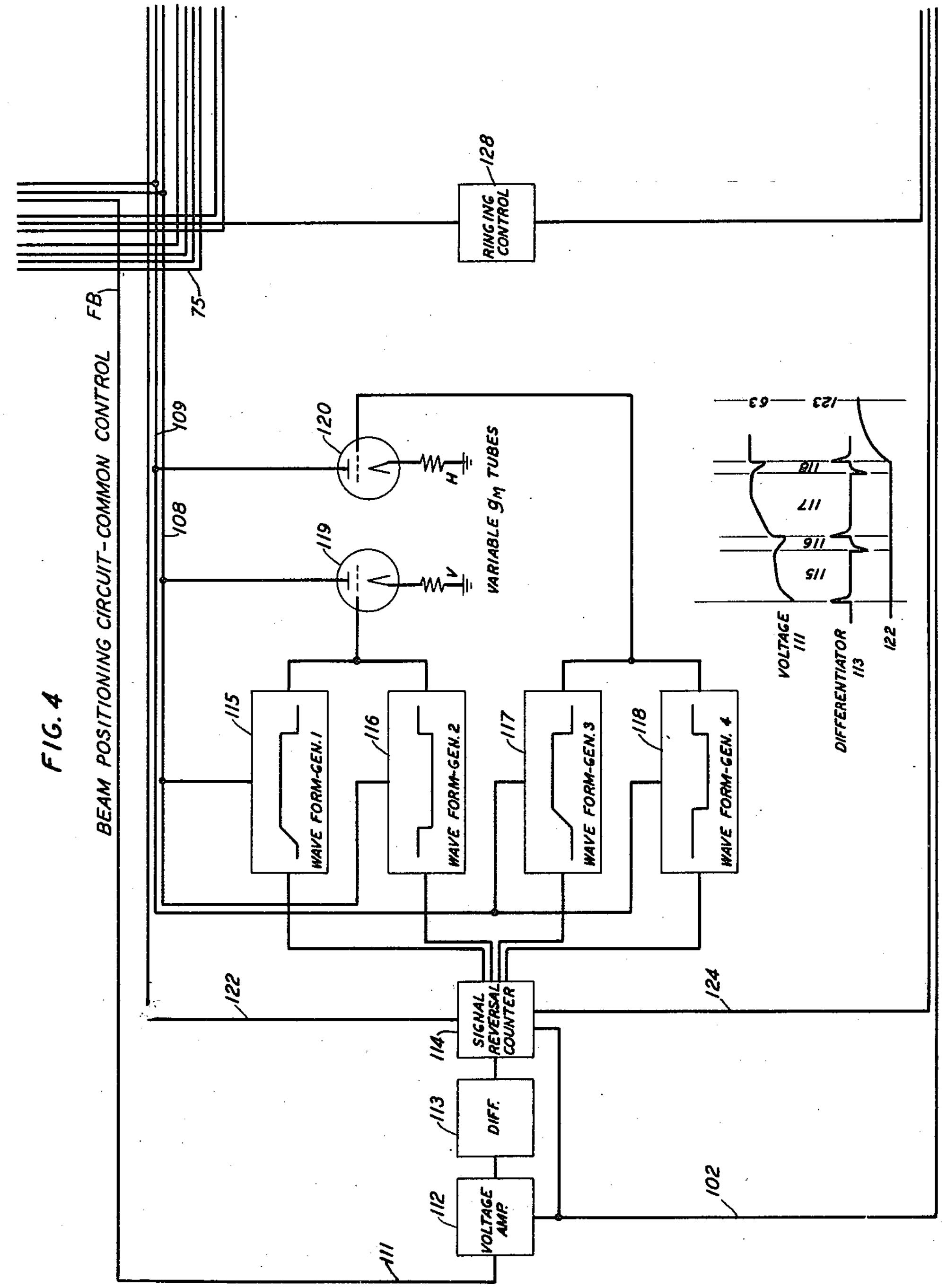
Figure 5:
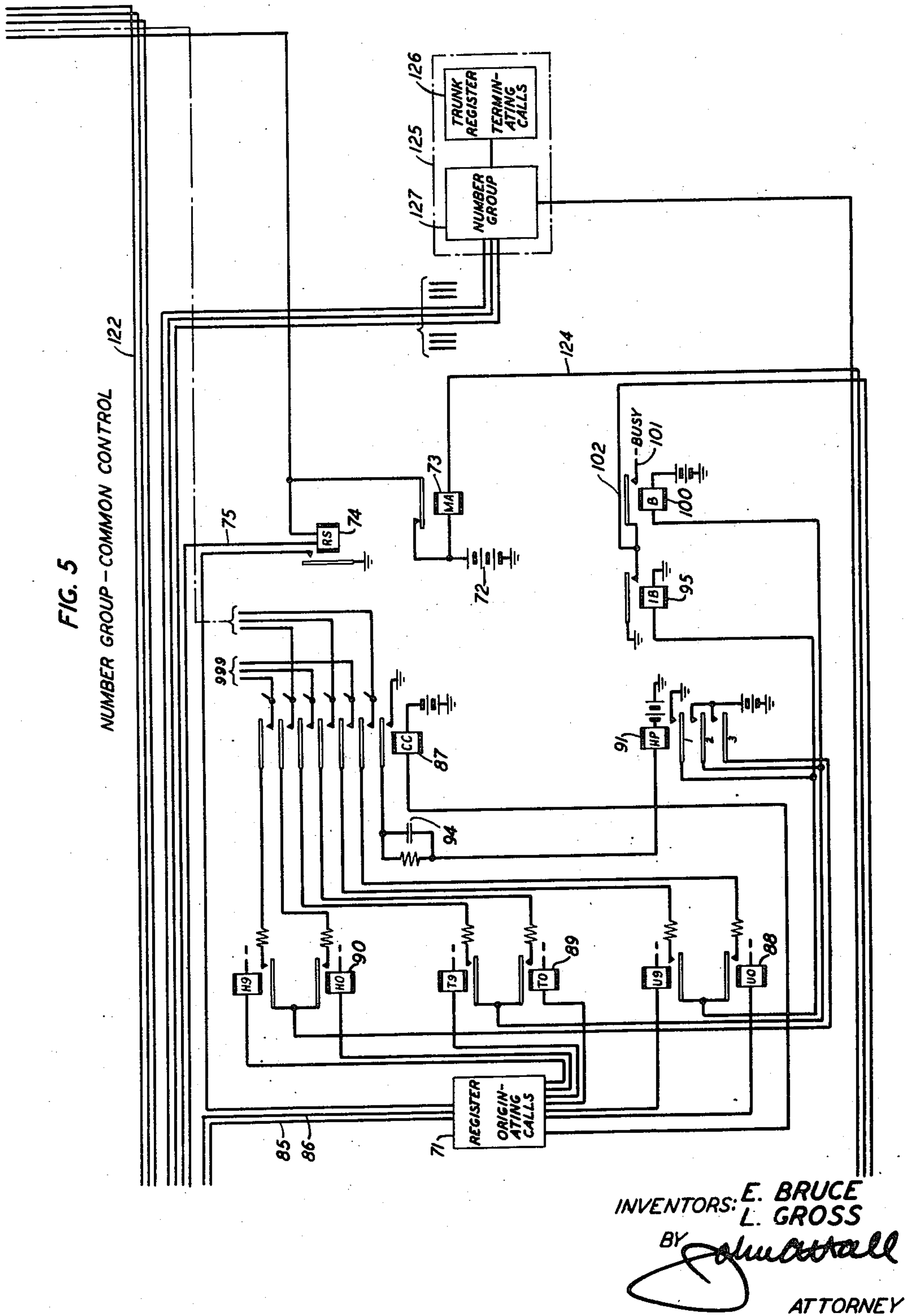

The common control shown in Figs. 4 and 5 transmits positioning voltages from the line to the trunk circuit and checks to see that a connection has been established before releasing. For the sake of simplicity it may be assumed that each subscriber is provided with a preset dial arrangement which will supply the dialed digits to a register within the common control circuit at a rate fast enough to avoid the complications necessary in systems where the holding time of the common control necessitates a plurality of common control devices and the allotting means therefor. The register herein shown in the rectangle 71 upon receiving the signals identifying the called line consults a number group device which tests for a busy or idle condition. At the completion of this test the common control has been connected to a trunk and the vertical and horizontal voltages are applied to the beam directors of that trunk. The beam is accurately centered upon the retrodirective mirror in the line appearance by the beam positioning circuit. The common control then sends a clamping signal to the trunk to hold the beam directors locked in place. The common control then retires.

*Number group*

The device shown in Fig. 5 is a conventional relay arrangement whereby digits transmitted by a calling line and registered in the register 71 may be used to select a trunk characterized by a three-digit number, as by way of example, one leading to a particular exchange characterized by such three-digit number. The said number group consists essentially of a set of units, tens and hundreds relays individual to the register 71 by means of which corresponding three common leads may be electrically affected to select a trunk or some other facility characterized by such a number.

*Beam positioning circuit*

When an idle circuit, whether it be a desired trunk, line or busy tone trunk, has been selected, then the beam positioning circuit of Fig. 4 comes into operation and centers the beam produced and controlled by the selected circuit on the retrodirective mirror of the calling line. A series of signals applied to the V (vertical) and H (horizontal) tubes causes them to pass current through the V and H resistors in the line array multiple thus controlling the deflecting voltages by means of the IR drop. At the end of its cycle of operation, the beam positioning circuit applies a clamping voltage to the beam directors, thus completing the duties of the common control.

FUNDAMENTAL OPERATION IN ESTABLISHING A CONNECTION

A calling line or trunk seizes a common control and then transmits into a register therein an identification of the called line or trunk. The common control then causes the line or trunk appearance which has the beam establishing means to establish a beam and to then direct it to the other appearance which supplies the identifying beam directing voltages, the common control acting to modify such voltages sufficiently to accurately position the beam.

The various line and trunk appearances are in groups and the appearance in each group is in what is termed a lock-out relation to the others so that only one at a time may be served by the common control. The lock-out circuit, fundamentally, is disclosed in Patent 2,326,551, granted August 10, 1943 to M. E. Mohr.

Let us now trace the operations in the establishment of a connection from substation 52 to the outgoing trunk circuit over conductors 67 and 68. The subscriber in initiating a call establishes a conventional substation network through which sufficient current will flow to operate the line relay 50. When the common control is free, positive battery 72 will be connected through the back contact of the main anode relay 73, through the winding of RS relay 74, conductor 75, resistor 76 to the main anode 77, of tube 78. The operation of relay 50 has connected positive battery potential over the back contact and armature 2 of the LCS relay 79 to the start gap anode 80 of the tube 78. If the potential of the start gap cathode 81, connected in common with other tubes in this group to the inductance 82 has not been raised too high by reason of the busy condition of another tube of the group then the tube will be fired at this start gap. Assuming that the common control is free as stated and that, therefore, the positive potential from the battery 72 is connected to the main anode 77, the firing of the tube at the start gap will now be transferred to the main gap so that current will flow from the positive battery over the main anode 77 to the main cathode 83 through the armature 3 and back contact of the LCS relay 79, the winding of the CC relay 84 to ground. Relay 84 is employed for effectively connecting the line circuit to the common control for an instant during which the number of the called line is transmitted to the register, the beam established at a selected outgoing trunk appearance and the beam positioned by the common control circuit.

A connection from the tip of the line is made over armature 2 and back contact of the RC relay 51, armature 2 and front contact of the CC relay 84, the tip wire 85 to the register 71. A connection from the ring conductor of the line is similarly made over armature 1 and back contact of the RC relay 51, armature 4 and front contact of the CC relay 84, conductor 86 to the register 71. The register 71 is conventional and will respond to signals sent from the substation 52 to register at least a portion of the identification of the called line. In the present case, the register 71 is shown as a means for operating the number group consisting of the ten units, the ten tens and the ten hundreds relays for electrically characterizing three conductors leading to a trunk tube 69 for selecting the corresponding outgoing trunk. The register 71 is indicated as having control over a connecting relay 87 so that if the UO relay 88, the TO relay 89 and the HO relay 90 have been operated then the three conductors leading to the trunk tube 69 will be affected. The start electrodes of other trunk tubes may also be affected but the trunk tube 69 is the only one which will have all three so affected and, therefore, is the only one which may be fired to establish a current from its main anode to its main cathode.

The number group controlled by the register 71 will attempt to seize the called trunk and will report the busy or idle condition to relays associated with the number group at this time. The operation of the trunk tube 69 is as follows. There is a start cathode 93 connected to the units wire and a start anode with a short gap to the start cathode connected to the hundreds wire. If this fires, then the secondary start anode 96 connected to the tens wire will become effective and will take over the current flow in this gas tube so that the electron stream in the tube is transferred from the hundreds to the tens wire. If the trunk is idle then a current flow will be established between the main anode 97 and the main cathode 98. Under this condition there will then be a current flow from the main anode 97 to the main anode 98 and a smaller current flow from the main anode 97 to the start cathode 93. There will also be a small current from the secondary start anode 96 to both the main cathode 98 and the start cathode 93. However, if the trunk is busy, then the potential of the main cathode will have been raised to the point where no current flow will be established from the main anode to the main cathode and hence the current stream from the secondary anode 96 to the start cathode 93 will persist and be of a volume great enough to operate the busy relay.

These operations may be followed in the circuits of Figs. 3 and 5 as follows. Upon the operation of the connecting relay 87 a circuit will be established for the momentary operation of the relay 91 during the charging period of condenser 94. During the interval that the relay 91 is operated, ground will be connected through armature 1 and front contact of relay 91 through the armature and front contact of the UO units relay, 88, thence to the start cathode 93. At the same time positve battery will be connected through the front contact and armature 2 of relay 91, the armature and front contact of the HO hundreds relay 90 to the start gap anode 92. Again, simultaneously, positive battery will be connected through armature 3 and the front contact of the HP relay 91, the armature and front contact of the TO tens relay 89 to the secondary starting anode 96. If the trunk is idle then the ionization within the tube caused by the current flow from the secondary anode 96 to the start cathode 93 will break down the main gap of the tube so that current will flow now from positive battery, the back contact and armature of the main anode relay 73, the main anode 97, the main cathode 98 through the armature 4 and back contact of the TLS relay 70, the winding of the TC relay 99 to ground.

In case this trunk were busy such condition would be denoted by the operation of the TLS relay 70 so that the cathode 98 instead of being connected through armature 4 of the TLS relay to a ground connection as just described would instead be connected to a positive battery connection so that the gap will not break down. In this case, the action of the relays 95 and 100 should be noted. If the trunk is properly seized, then upon the deenergization of the relay 91 the relay 95 will operate but the relay 100 will not be affected because the current flowing from the secondary anode 96 to the main cathode 98 will be insufficient to operate this relay. Under this condition the conductor 102 will be grounded for a purpose which will be shortly described. If, on the other hand, the trunk is busy then the main gap does not break down and current will flow from positive battery through the winding of the relay 100, the armature and front contact of the TO tens relay 89, the secondary start anode 96, the start cathode 93, the front contact and armature of the UO units relay 88, the winding of the relay 95 to ground. Therefore, both relays 95 and 100 will operate and will act together to ground the line 101 leading to a busy tone circuit.

Any conventional means in this connection may be used, such for instance, as a busy tone relay per line associated with the line relay 50 which could be operated through the contacts of the CC relay 84 and remain locked in until the calling subscriber recognizes the busy tone and hangs up.

A more economical means, however, is indicated in the drawings as consisting of another circuit similar to the outgoing trunk appearance shown in Fig. 3. In such a case where the trunk tube 69 has failed to fire because the associated circuit is busy the conductor 101 will be grounded and this will extend to a start cathode of a tube in the busy back appearance 103 so as to seize such a busy tone circuit. This circuit will then establish a beam and position it in the same manner that the beam from the circuit shown in detail is positioned and which will be described shortly. In such a busy tone trunk the tip and ring line conductors similar to the conductors 67 and 68 will in this case extend to a source of busy tone 104.

Let it be assumed that the outgoing trunk circuit shown in detail in Fig. 3 is idle. Therefore, when the trunk tube 69 fires, a circuit will be established from the main anode 97 through the main cathode 98, the armature 4 and back contact of the TLS relay 70 to the winding of the TC relay 99 which thereupon operates. During the short interval over which this circuit is established the presence of the common inductance 105 and the resistance 106 in the circuit of the main anode acts to depress the potential on the anodes of other tubes connected in plurality therewith and to, therefore, effectively lock out any other tube than the one now in operation.

The trunk connector relay 99 in operating extends ground through its armature 2 and front contact through the thermistor 107 to the lamp 55 representing a source of light to establish the beam. The thermistor 107 is a device which initially has high resistance but which due to the current flow and the consequent heating thereof will lower its resistance. Therefore, the lamp 55 will not come up to full brilliance immediately thereby avoiding the sweeping of a light beam over other line appearances during its establishment and positioning.

The trunk connector relay 99 also connects through its front contacts and armatures 3 and 4, the two beam positioning devices 62 and 61, respectively, and thence over the conductors 108 and 109 to the beam positioning circuit in Fig. 4. At the same time the control connector relay 84 in Fig. 2 has connected taps for the horizontal and vertical voltages to the conductors 108 and 109. The taps for supplying these voltages are shown as coming from a precision battery which means that they are connected to predetermined voltage points supplied by a battery which is maintained very precisely.

It may be noted at this point that the beam which is established at each trunk appearance will be positioned accurately at the center of the field when both of the beam positioning devices are in their normally unoperated positions. Therefore, the beam may be moved horizontally to any one of fifty positions toward the right or alternatively to any one of the fifty positions toward the left. Similarly, the beam may be moved by the other beam director to any one of fifty positions above or alternatively to any one of fifty positions below its normal position. Each line circuit, therefore, is connected to a pair of precision battery leads of the proper polarity and magnitude to move the beam of a distant trunk appearance to the line appearance associated therewith.

Due to the grounding of the conductor 102 and the application of the precision battery voltages to conductors 108 and 109 the beam will be directed toward the line appearance as indicated in Fig. 3 even though the beam may not yet be established in all of its brilliance.

The beam positioning circuit of Fig. 4 is a means for accurately centering the beam which is transmitted from the trunk appearance on the line appearance in Fig. 3. As the beam strikes the line appearance then the photodetector 46 becomes active and the current flow therethrough and thence through the resistance 110, the winding of the LCS relay 79, through the front contact and armature 2 of the line relay 50 to ground increases. The lead connected to the armature 6 and front contact of the CC relay 84 and thence over conductor 111, therefore, carries a potential measured by the IR drop which is the product of the current flowing in the photodetector 46 and the resistance of the LCS relay 79 and the resistor 110. Therefore, as the beam becomes established the voltage on conductor 111 rises.

The device represented by the rectangle 112 is a voltage amplifier which may be in the form of a conventional vacuum tube voltmeter. This when it is enabled by the connection of ground to conductor 102 communicates the voltage changes in the conductor 111 to the differentiator 113. This is a device consisting essentially of a small condenser and a resistance which upon the application of a voltage thereto will produce a positive signal in the form of a positive impulse of short duration. As the beam is moved to the photodetector 46 it is knowingly moved slightly past the retrodirective mirror 42. In other words, the voltage of the precision battery connected to conductor 108 is made slightly higher than is actually necessary so that as the beam is being centered the voltage on conductor 111 rises and then begins to decrease. As soon as the voltage reaches its peak value and begins to decrease the differentiator 111 generates a negative signal. These positive and negative signals are transmitted by the differentiator to the signal reversal counter 114 to sequentially energize the wave form generators 115, 116, 117 and 118. The generators 115 and 116 control the tube 119 and the generators 117 and 118 control the tube 120. These tubes are known as variable $g_m$ tubes and each responds to the potential applied to its grid to cause a larger or smaller amount of current to flow in its anode-cathode circuit. The anode of tube 119 is connected to conductor 108 and, therefore, as the current increases the drop in the resistor 121 increases so that the potential of the conductor 108 therefore somewhat decreases. Hence, when the rising voltage of conductor 111 is communicated to the wave form generator 115 it causes the potential of the grid of the tube 119 to rise accordingly. Hence, the potential of conductor 108 is somewhat reduced so that now the beam as controlled by the element 62 which was swept almost past the center point of the line appearance is now brought back and swept in the opposite direction a very short distance past the center point. As the potential on conductor 111, therefore, starts to decrease the differentiator 113 sends a negative impulse which operates the signal reversal counter 114 to transfer from the wave form generator 115 to the wave form generator 116 and this now reduces the potential on the grid of the tube 119 by a small definite amount whereby the potential of conductor 108 through the smaller amount of current flowing through resistor 121 is allowed to rise a smaller and definite amount to exactly center the beam on the line appearance retrodirective mirror 42. The change from a falling potential on conductor 111 to a rising potential now causes the differentiator 113 to operate to send another pulse which now enables the wave form generator 117 so that in this same manner the beam as controlled by the element 61 is centered in the horizontal direction.

The differentiator is a device known as an RC peaker and a description of such a device may be found in the "Principles of Radar," a publication of the Technology Press, Massachusetts Institute of Technology, published by the McGraw-Hill Book Company, Incorporated, 1946, pages 2–17 et seq. Reference may also be made in the volume to pages 3–12 et seq. under "Sweep-Voltage Circuits" and particularly to pages 3–20 under "Sweep Integrating Circuits" where means to insure a constant potential at the end of a sweep may be incorporated in the differentiator 113.

The signal reversal counter is a conventional chain of counting tubes which responds to the positive and negative pulses generated and transmitted by the differentiator 113. A reference to a device of this nature may be found in a volume entitled "Time Bases" by O. S. Puckle, published at New York by John Wiley and Sons, Incorporated. Schmitt's trigger circuit, pages 57 et seq., is a device which will operate in the desired manner.

Thus, as the beam is established it is automatically centered by means of the beam positioning circuit (Fig. 4). When the vertical director 62 and the horizontal director 61 have adjusted the beam so that the maximum effect in the photodetector 46 is achieved then the signal reversal counter 114 connects ground to the conductor 122 which is transmitted through the armature 5 and front contact of the TC relay 99 to operate the clamp magnets 63 and 123. These clamp magnets thereupon secure the mirrors 59 and 60 in the positions to which they have been moved so that upon the break in communication between the precision battery connected to the armatures 7 and 8 of the CC relay 84 and the beam directors 61 and 62, the mirrors 59 and 60 will be maintained in position so that the deflections of the beam will remain fixed.

In the lower part of Fig. 4 the action described has been pictured in the form of several graphs plotted against time. The graph of voltage on conductor 111 is shown as beginning from the time that the voltage on the conductor 111 becomes effective. At this instant the differentiator 113 produces a positive pulse and thereafter the generator 115 is in operation. When the voltage then begins to diminish a negative pulse is generated and the generator 116 becomes effective. The response of the generator 116 falls very quickly and boosts the voltage of the conductor 111 upwardly again whereupon another positive pulse is produced by the differentiator 113. This action is followed as pictured until the maximum voltage is achieved which means the maximum light is being received by the photodetector 46. The lowermost graph shows that upon the last positive pulse produced by the differentiator 113 the conductor 122 is grounded which results somewhat later in the operation of the clamping magnets 63 and 123. The signal reversal counter 114 also at this time grounds the conductor 124 to operate the main anode relay 73 and thus disconnect the main anode potential from the conductor 75. This will also release the RS relay 74 so that the ground applied to the register for enabling it and for enabling the number group is removed thus returning these devices to normal.

In connection with these graphs it need be noted at the present that the rise of voltage in the conductor 111 is accompanied by the rise of current in the LCS relay winding 79, so that this relay responds and by operating its armature 3 opens the circuit for the CC relay 84. However, and the point to be mentioned here is that, the action of the beam positioning circuit shown in Fig. 4 takes place in a matter of a few hundred microseconds, whereas it takes the relay 79 and thereafter the relay 84 a number of milliseconds to operate so that the impulse to operate the relay 79 and to release the relay 84 is coincident with but far longer in point of time than the operation of the beam positioning circuit.

After the beam has been properly positioned and has come to full brilliance then the reflection of that beam from the retrodirective mirror 42 will extend back to the trunk appearance and will affect the photodetector 65. This increases the current flow therein which may be traced from battery through a coil of the hybrid coil 66, the photodetector 65, the winding of the TLS relay 70 to ground. When no light strikes the photodetector 65 the current flow through the relay 70 is insufficient to cause the operation of this relay but as soon as the light beam is established the photodetector 65 is energized and the increase of current in the relay 70 is sufficient to cause its energization.

Through its armature 3 and front contact the TLS relay 70 establishes a direct connection to the lamp 55 to hold this at full brilliance independent of the thermistor 107 during the use of the trunk.

Upon the operation of the TLS relay 70 the TC relay 99 is deenergized and therefore releases. As the beam comes to full brilliance and the photodetector 46 passes more current the relay 79 operates and releases the CC relay 84 as described. Relay 79 connects a source of positive battery to the main cathode of the line tube 78 so as to render this tube incapable of firing if a connection should be directed to it while the line 52 is in use. Ground is connected through the front contact and armature 4 of the LCS relay 79 to maintain the shutter 43 opened during the use of the established connection.

When the subscriber station 52 relinquishes the connection the line relay 50 will become deenergized whereupon the LCS relay will release and in releasing will release the shutter magnet 44 so that light from the distant beam will be shut off and the reflected beam will be interrupted and no signal is returned to the photodetector 65. The current through photodetector 65 reduces to the point where the TLS relay 70 releases and lamp 55 is extinguished. Thus the connection is released.

Means for establishing a connection to the line are very roughly indicated. A broken line rectangle 125 in Fig. 5 shows a trunk register 126 which may be set by signals sent over an incoming trunk to operate a number group 127. This number group 127 shows three conductors leading therefrom to the line tube 78 so that the tube may be fired in a similar manner to that described in connection with the trunk tube 69, that is, the tens wire may be grounded, the units to the short gap may be connected to a source of positive potential to break down this short gap. If this happens the hundreds wire connected to a longer gap and connected also to a source of positive potential will then transfer the electron stream within the tube. It may be noted that this tube will select any one of the lines designated by the three last digits, the selection of the thousands digit may be made between the trunk register and the number group, that is, the trunk register may activate one of ten number groups for this purpose. If the gap between the anode connected to the hundreds wire and the cathode connected to the tens wire breaks down and the line is idle, then an electron stream will be established between the main anode 77 and the main cathode 83 and during the operation of this tube locking will be provided by the resistance 76 and the associated inductance. The current then flowing through this circuit operates the CC relay 84 and through the agency of a ringing control circuit 128 the RC relay 51 is operated. This locks into operation through the back contact of the ringing trip relay 52 so that the common control may be dismissed as soon as the beam from the incoming trunk appearance to the line has been established. As soon as the CC relay 84 is operated then the precision battery terminals characterizing this particular line will be connected to the conductors 108 and 109 to position the beam in the same manner as that hereinbefore described. It should be noted that in all cases the operation of the connecting relays such as the relay 84 and the relay 99 occupy a very small interval since the operation of the register of the number group and the beam positioning circuit is very rapid.

The ringing control relay is now in operation and this may operate over a comparatively great length of time. When the subscriber at station 52 answers, then the ringing trip relay 52 responds and this releases the RC relay 51. Immediately thereupon the line relay 50 is operated to hold the connection in the manner hereinbefore described.

Should the called subscriber at substation 52 fail to respond, then the release of the connection over the incoming trunk by the release of a supervisory relay in that circuit will cut off the beam and thus release the LCS relay 79. The LCS relay will open the holding circuit for the RC relay 51 and thus release the connection.

Figure 6:
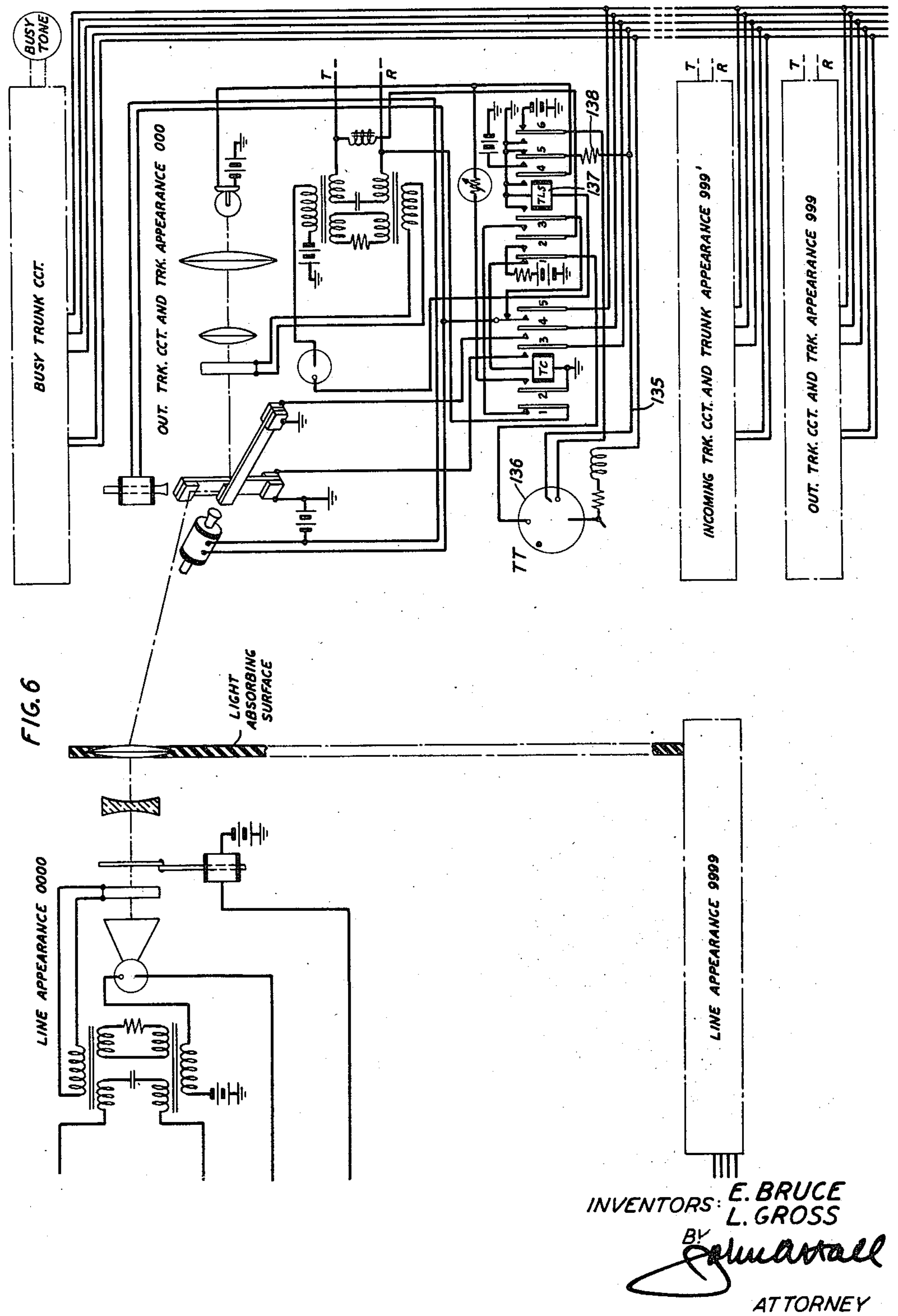
Figure 7:
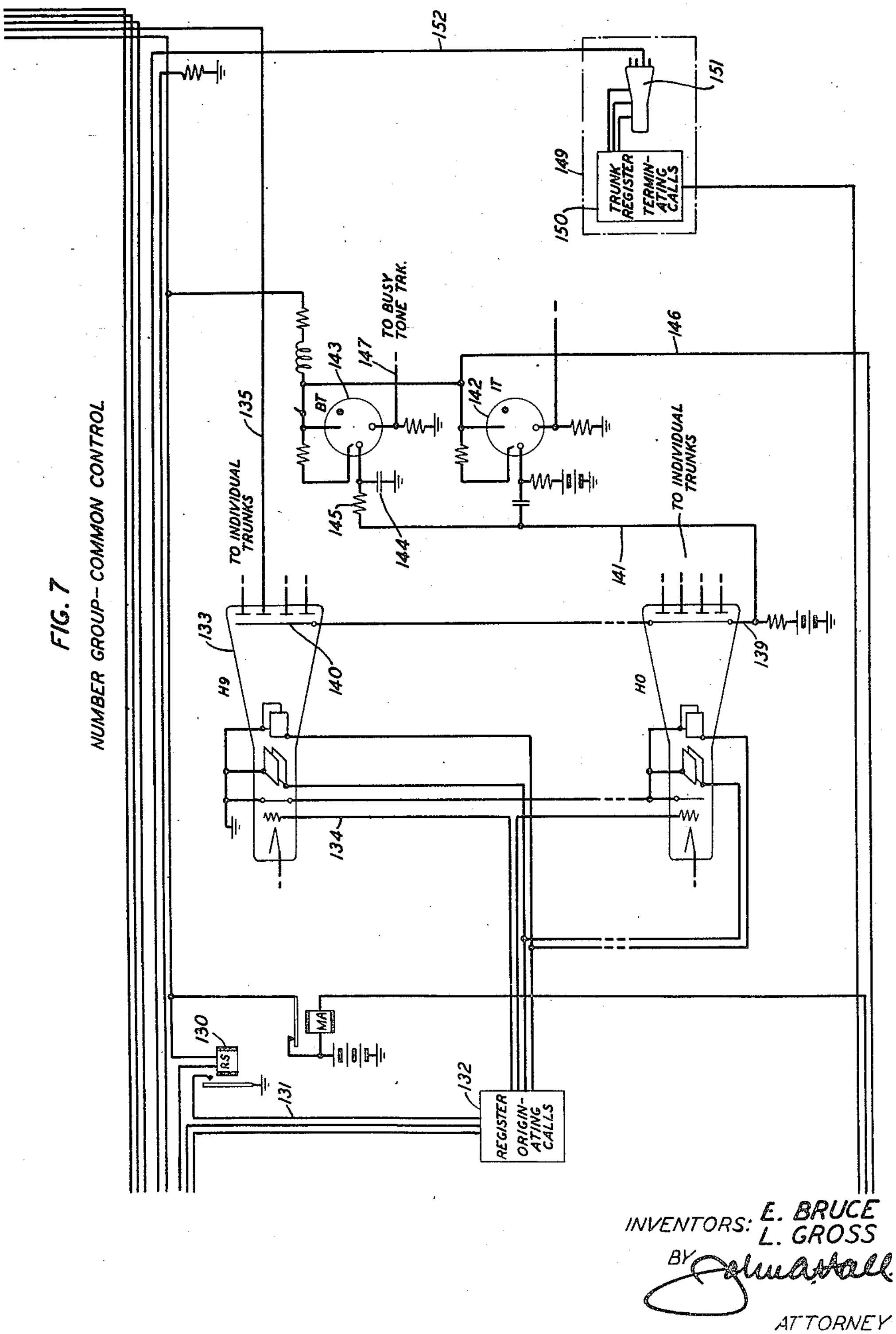

A variation of the circuit is shown with Figs. 2, 4, 6 and 7 arranged as indicated in Fig. 11. Fig. 2 will differ in this case only in that the secondary start anode marked H (for hundreds) is not used. The start cathode marked T (used in making a call to the line 52) is held at ground potential. Otherwise, the operation of Fig. 2 is exactly as hereinbefore described. The main difference in this arrangement is the use of an electronic number group and an electronic busy and idle test means. These are shown in Fig. 7. The circuit of Fig. 6 is almost the same as the circuit of Fig. 3 and differs only in the arrangements for starting the trunk tube. These differences will be explained but the remainder of the circuit will be assumed to operate in exactly the same manner as that of Fig. 3.

In Fig. 7 when the subscriber at substation 52 is making a call and the tube 78 has fired then the main anode current through the winding of relay 130 will operate this relay and by placing ground on conductor 131 will enable the register 132. When the information stored on the preset dial at the substation 52 is transmitted to the register then this register will pick out one of a number of cathode-ray tubes such, for instance, as the H9 tube 133 through the electrical selection of the individual grid wire 134. The cathode-ray produced in this tube is now directed to a particular one of one hundred dynodes, let us say that one connected to the individual wire 135 leading to the correspondingly numbered trunk in Fig. 6.

The normal connections to the trunk tube 136 are as follows. The start cathode of this tube is connected through armature 6 and back contact of the TLS relay 137 to a source of negative potential (−70 volts). The start anode of this tube is connected through the armature 5 and back contact of the TLS relay 137 to ground potential through a resistor 138. This start anode is also connected to the wire 135 from the cathode-ray tube. Let us assume that the potential of a battery connected to the secondary collector grids of the cathode-ray tubes by conductor 139 is +100 volts. Therefore, when the cathode-ray is directed to the dynode connected to conductor 135 and the trunk with which the trunk tube 136 is associated is idle the effective connection made between the dynode and the secondary collector grid 140 will cause a current to flow between the +100-volt battery and the ground potential at the back contact of armature 5 of the TLS relay 127. Due to the resistor 138 the change in potential at the start anode of the tube 136 is, by way of example, from ground to say +30 volts. The corresponding change of potential on conductor 139 from +100 volts to +30 volts, therefore, constitutes what may be termed a strong pulse on conductor 141. Conductor 141 is connected in parallel to the two tubes 142 and 143 in such a manner that the tube 142 will immediately respond to a large pulse such as that now described. This tube therefore fires and through the lock-out connection between the main anodes of the tubes 142 and 143 prevents the tube 143 from responding. Due to the connection of the condenser 144 and the resistance 145 the tube 143 is somewhat slow to respond so that before it can respond to this large pulse on conductor 141 it is locked out through the operation of the tube 142. Thus, if the trunk selected is idle the tube 142 will be fired and the tube 143 will remain locked out. Due to the firing of tube 142 the conductor 146 corresponding to conductor 102 in Fig. 5 will be affected to enable the beam positioning circuit.

Let us now assume that the trunk is busy and that, therefore, the TLS relay 137 is operated. In this case the start cathode of the trunk tube 136 is grounded (zero potential) by armature 6 and the start anode is held at a positive potential (+50 volts, for example). Therefore, when the register 132 has been set and the cathode-ray directed to the dynode connected to conductor 135 the result will be a small pulse on conductor 141 for the connection of 50 volts through the resistor 138 to the conductor 139 will produce only a small change in potential as compared with that produced in the previous case. The tube 142 will not respond to such a small pulse but the tube 143 will do this in time. Therefore, the tube 143 will fire and in the same manner will lock out the tube 142. The tube 143 will now affect a conductor 147 which may be used in the same manner as hereinbefore described to established a beam from a busy trunk circuit to supply busy tone to the calling subscriber.

A call in the other direction, that is, from an incoming trunk to the called subscriber at substation 52 will be handled in the same manner as described in Fig. 5, that is, a facility 149 including a trunk register 150 and an electronic number group represented by the cathode-ray tube 151 will be employed to receive and register the incoming identification of the called party. Through the electronic number group arrangement then the conductor 152 leading in this case to the start anode of the line tube 78 will be affected and the call to this substation established.

In all other respects the operation of the various devices are the same as described in connection with the arrangement of figures shown in Fig. 10.

What is claimed is:

1. A beam switching telecommunication system comprising a plurality of subscribers' lines and a line at a distant point, a beam reflector individual to each said subscribers' line, said reflector consisting of the surfaces contiguous to the intersection of three mutually perpendicular reflecting surfaces, a light sensitive device formed on one of said reflecting surfaces and responsive to the modulations of a light beam directed into said reflector, means for vibrating another one of the said reflecting surfaces for modulating a light beam reflected by said reflector, said light sensitive device and said vibrating means being connected to the said subscriber's line to which said reflector is individual, for translating incoming beam signals to electrical signals and outgoing electrical signals to beam signals, and means individual to said line at a distant point for selectively directing a beam toward the reflector of a desired one of said subscribers' lines, said distant point means also including a light sensitive device and a light controlling device connected to said line thereat.

2. A beam switching telecommunication system comprising a plurality of subscribers' lines, a beam reflector individual to each said line, said reflector consisting of the surfaces contiguous to a point defined by the intersection of three mutually perpendicular reflecting surfaces, a light sensitive device mounted in cooperative relationship with each said reflector and responsive to a fraction of a beam directed into said reflector, a light controlling device interposed in the path of a beam reflected by said reflector, said light sensitive device and said light controlling device being connected to the said subscriber's line to which said reflector is individual for translating incoming beam signals to electrical signals and outgoing electrical signals to beam signals, a link circuit at a distant point including a pair of devices each including means for directing a beam toward one of said reflectors, a light sensitive device and a light controlling device connected to a line thereat whereby a connection may be extended between two of said lines by a pair of beams each directed to one of said lines by said link circuit, a line circuit for each of said lines, means included therein for identifying itself and subscriber operated means for identifying another line to which a connection is to be extended, a common control means responsive to said identifying means, and means under control of said common control circuit for controlling the said beam directing means of said link circuit.

3. A beam switching telecommunication system comprising a switching room, a plurality of subscribers' lines, apparatus individual to each of said lines mounted at regularly spaced intervals on one wall of a switching room, each said line apparatus including a beam reflector consisting of the surfaces contiguous to a point defined by the intersection of three mutually perpendicular reflecting surfaces, a photodetector mounted to intercept a fractional portion of a light beam directed into said reflector, a light modulating device mounted in the path of a beam reflected from said reflector and means for blocking a beam into and out of said reflector, a plurality of other line circuit apparatuses mounted on a distant and parallel wall of said switching room, a light modulating device in the path of said beam, a photodetector mounted to be in the path of and responsive to a beam reflected from a distant beam reflector and a pair of beam directing devices, a source of light for establishing a beam and a thermistor in series therewith for delaying the establishment of said beam, each said line apparatus being characterized by a predetermined signal which communicated to said beam directors will cause a beam established to be directed to said line apparatus, said thermistor consisting of a circuit element responsive to current therethrough to limit the rate of increase of the said current to delay the establishment of a said beam until said beam has been directed to said line apparatus whereby the sweeping of an established beam over other line appearances will be avoided.

4. A beam switching telecommunication system comprising a switching chamber, a plurality of subscribers' lines each terminating in a line apparatus mounted on the surface of one wall of a switching chamber, each said line apparatus including a beam reflector consisting of the surfaces contiguous to a point defined by the intersection of three mutually perpendicular reflecting surfaces, a receiver consisting of a photodetector mounted to intercept a fractional portion of a beam directed into said reflector, a transmitter consisting of a light modulator arranged in the path of a beam reflected from said reflector, a beam intercepting device in the path of a beam entering and leaving said reflector responsive to the subscriber's use of said line, and a plurality of other line apparatuses mounted on an opposite and parallel wall of said switching chamber, each having a beam establishing and directing means, a beam modulating transmitter in the path of a beam established thereat and a photodetector mounted in the path of and responsive to a beam reflected from a distant reflector, certain of said other line apparatuses being connected to special signal sources, means for selecting a desired one of said other line apparatuses, and means responsive to the busy condition thereof for automatically activating one of said special signal line apparatuses.

5. A beam switching telecommunication system comprising a switching chamber consisting of an enclosed space having beam establishing and beam pointing devices arrayed on one surface thereof and corner reflectors arrayed on an opposed surface thereof, each said beam establishing device consisting of a beam source and having mounted in cooperative relationship therewith a pair of beam deflecting mirrors each mounted on electro-responsive moving means for directing said beam in selected directions, a beam modulating means interposed in the line of said established beam and a photodetector mounted to intercept a reflection of said beam, a communication channel individual to each said beam establishing device interconnected with said modulating means and said photodetector for transmitting signals from and receiving signals into said communication channel, each said corner reflector having individual thereto a beam modulating means interposed in the line of a beam directed into said reflector and reflected therefrom, a photodetector mounted to receive a portion of a beam directed into said reflector, a communication channel individual to each said corner reflector interconnected with said modulating means and said photodetector for transmitting signals over a beam reflected by said corner reflector and for receiving signals over a beam directed into said corner reflector, each said communication channel being electrically and separately identified and means for communicating the said electrical identification of a said communication channel to a distant beam establishing device for controlling the said beam deflecting mirrors thereat to point a beam therefrom to said identified associated corner reflector.

EDMOND BRUCE.
LEO GROSS.

REFERENCES CITED

The following references are of record in the file of this patent:

UNITED STATES PATENTS

| Number | Name | Date |
|---|---|---|
| 1,384,014 | Fessenden | July 5, 1921 |
| 1,771,148 | Sprague | July 22, 1930 |
| 2,224,677 | Hanscom | Dec. 10, 1940 |
| 2,235,803 | Carpenter | Mar. 18, 1941 |
| 2,241,031 | Holden et al. | May 6, 1941 |
| 2,287,881 | Holden | June 30, 1942 |
| 2,293,899 | Hanson | Aug. 25, 1942 |
| 2,345,445 | Atwood | Mar. 28, 1944 |
| 2,387,018 | Hartley | Oct. 16, 1945 |
| 2,432,984 | Budenbom | Dec. 23, 1947 |
| 2,443,643 | Schelleng | June 22, 1948 |
| 2,477,821 | Potts | Aug. 2, 1949 |